Jan. 22, 1929.
W. H. PARKER ET AL
1,700,073
VALVE
Filed Sept. 10, 1927
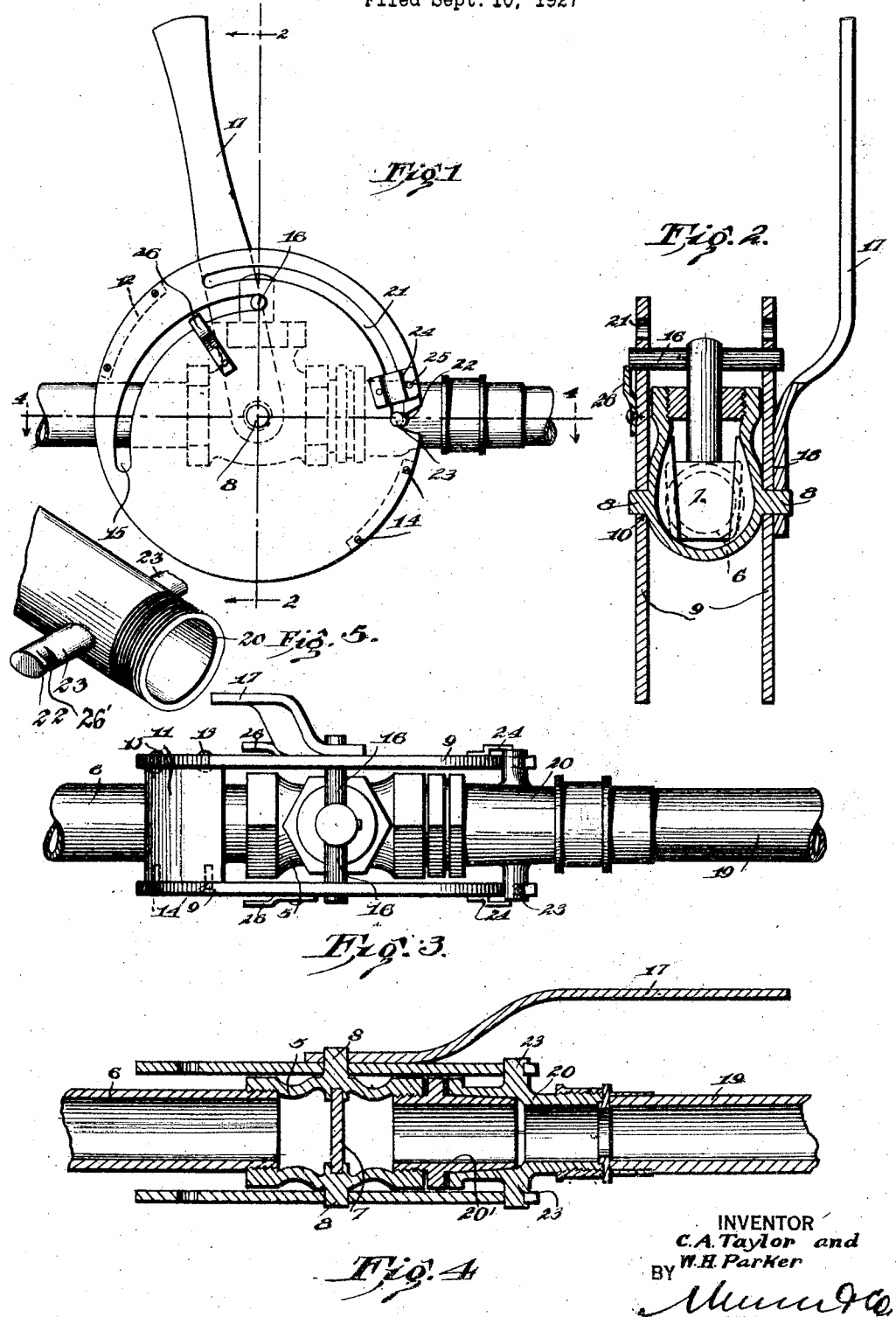
INVENTOR
C. A. Taylor and
BY W. H. Parker
ATTORNEY Patented Jan. 22, 1929.

1,700,073

UNITED STATES PATENT OFFICE.

WILLIAM H. PARKER AND CHARLES A. TAYLOR, OF DENVER, COLORADO.

VALVE.

Application filed September 10, 1927. Serial No. 218,795.

Our invention is a combined coupling and valve actuating device and one of its objects is to provide means for coupling a hose or pipe to a supply pipe and control the water supply to the hose or pipe.

Further the invention provides a valve attachment whereby a hose may be quickly attached or detached from a liquid supply valve and which is operable to actuate the valve to open or closed positions.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a side elevation of the invention in use;

Figure 2 is a vertical section on line 2—2 of Figure 1;

Figure 3 is a top plan view;

Figure 4 is a horizontal sectional view on line 4—4 of Figure 1; and

Figure 5 is a detail view of the invention.

Referring to the invention in detail a conventional globe valve 5 attached to a fluid supply pipe which for example may be the service line for a hose, embodies a reciprocatory valve element 7.

Rotatable about laterally projecting studs 8, formed upon the casing of the valve at diametrically opposite points are parallel disks 9, the latter having central openings 10 for the reception of the studs 8. To connect the disks together longitudinally curved plates 11 are interposed therebetween at diametrically opposite points and are formed with parallel flanges 12, one of each plate 12 which is riveted to one disk, as at 13, while the other flange of each plate is detachably connected to the other disk by removable fastenings 14 for the purpose of assembling the disks with the valve.

To raise and lower the gate valve to open or closed positions, incident to the rotation of the disks, parallel longitudinally curved slots 15 are provided in the disk and are eccentrically disposed with respect to the axis of the disks and receive oppositely projecting lugs 16 integrally formed with the upper end of the stem of the valve element. A hand lever 17 having one end pivotally secured on one of the studs 8 is welded or otherwise secured to one of the disks as at 18. It will be observed that upon forward or backward movement of the hand lever the valve element will be raised or lowered to open or closed position, due to the eccentricity of the slots whose walls engage the lugs and cause vertical displacement of the lugs and valve element.

The invention provides means for quickly coupling a hose or other conduit 19 with the globe valve and for this purpose a female coupling member 20 is provided to receive a male coupling member 20' threaded into one end of the globe valve casing. In order to positively hold the female coupling member on the male coupling member parallel longitudinally curved and eccentrically exposed slots 21 are provided in the disks, and have tapered lateral branches or entrance slots 22 which open upon the edges of the disk to permit entrance of lateral lugs 23 formed on the male coupling member at diametrically opposite points and pass into the slots 21. These slots 21 are of a greater radius than the slots 15 and are disposed with their inner ends overlapping the slots 15. U-shaped straps 24 bridge the slots 21 at points adjacent the branch slots 22 and are riveted or otherwise secured to the disks as at 25 to hold the separated edge portions of the disk caused by providing the slots 21 and 22 against distortion.

As illustrated in Figure 1 the lugs 23 are substantially oval in cross section and are formed with grooves 26' which receive the walls of the slots 21 and 22 to retain the disks against lateral movement.

A gauge element or indicator 26 is carried by one of the disks for determining the position of the handle when the valve is in closed position.

To apply the hose and simultaneously open the valve the female coupling is inserted on the male coupling, the lugs pass into the entrance slots or branches to dispose the former adjacent ends of the slots 21. The hand lever is then rocked forwardly rotating the disk and causing the walls of the slots 21 to pass over the lugs bindingly engaging the same and thereby drawing the male coupling member into binding engagement with the female coupling member. Incident to this rotation of the disk the walls of the slots 15 engaging the lugs 16, the valve element is raised to open position.

It will be observed, due to the binding engagement of the slots 21 with the lugs 23, the hand lever and valve will remain in this position regardless of the vibration caused by the flow of water or other liquid through the valve, as well as the holding coupling member in positive engagement with the female coupling. To detach the hose and close the valve the hand lever is moved in the opposite direction.

What is claimed is:

1. In combination a valve, a pair of coupling members one of which being permanently attached to the valve and the other being insertable thereon and provided with lateral lugs, a pair of disks rotatably supported adjacent the valve having eccentric slots engageable with the lugs to hold the detachable coupling member on the fixed coupling member, and means operable by the rotation of the disks to open the valve and vice versa.

2. In combination a valve casing having a reciprocatory valve element, a coupling member engageable with the valve casing and having a lateral lug thereon, a disk rotatably supported upon one side of the valve casing and having eccentric slots therein, one of which being engageable with the lug to draw the coupling member into engagement with the valve casing, and the other having operative connection with the valve element to actuate the same to open and closed positions.

Signed at Denver in the county of Denver and State of Colorado this 6th day of September, A. D. 1927.

CHARLES A. TAYLOR.
WILLIAM H. PARKER.